March 23, 1965 J. B. WINN 3,175,162
NONDISCRIMINATING, BIPOLAR MONOSTABLE MULTIVIBRATOR
Filed Aug. 4, 1961
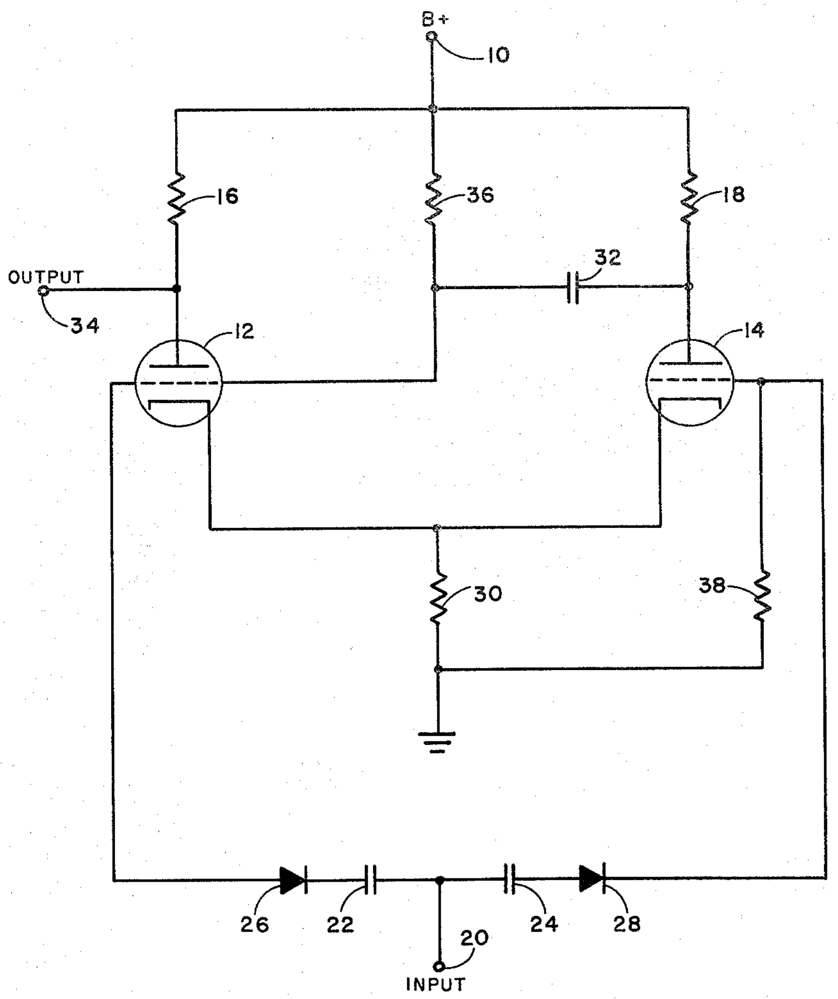
James B. Winn,
*INVENTOR.*
*BY* S. V. Rotondi
A. T. Dupont
D. H. Ward
ATTORNEYS.

United States Patent Office 3,175,162 Patented Mar. 23, 1965

3,175,162
NONDISCRIMINATING, BIPOLAR MONOSTABLE MULTIVIBRATOR

James B. Winn, Las Cruces, N. Mex., assignor to the United States of America as represented by the Secretary of the Army Filed Aug. 4, 1961, Ser. No. 129,487
2 Claims. (Cl. 328—196)
(Granted under Title 35, U.S. Code (1952), sec. 266)

The invention described herein may be manufactured and used by or for the Government for governmental purposes without the payment of any royalties thereon.

This invention relates in general to trigger circuits and in particular to a nondiscriminating, bipolar, monostable multivibrator.

As used hereafter, the term "on time" refers to that condition in which the leading edge of an output signal is coincident in time with the leading edge of an input signal.

Monostable trigger circuits capable of producing an "on time" output for either polarity of an input signal have previously required manual switching means and the knowledge by an operator of the polarity of either the input or output signal. Three basic prior art circuits may be considered in pointing out prior difficulties and disadvantages in bipolar circuits.

The first includes a single triode having manual switching means to select an output from either the plate or the cathode. This circuit requires that an operator must know the polarity of either the input or output signal in order to make the proper and desired selection. Further disadvantages of this circuit are that the pulse width cannot be adjusted and for balanced output, the gain cannot be greater than unity.

A second circuit is a monostable multivibrator of the two tube type which will produce an output from either a positive or a negative input signal. The output pulse, however, will not be "on time" for both polarities of input signal.

A third circuit includes a switch connected in combination with the above second circuit in such a manner that a negative pulse may be applied to the grid of one tube and a positive pulse to the grid of the other tube. The output pulse will then be "on time" for each polarity, however, manual selection by an operator is again required. The only advantage of this circuit over the first is that the output pulse width can be adjusted and balanced output can be achieved with amplification.

It is, therefore, the primary object of this invention to provide a monostable multivibrator capable of having an output "on time" regardless of input polarity and without manual operation.

It is another object of this invention to provide such a circuit in which the output pulse width can be adjusted.

It is a further object of this invention to provide such a circuit in which the gain can be greater than unity for balanced output.

These and other objects are fulfilled by a circuit which is basically composed of an input circuit which automatically isolates each polarity of input signal to a corresponding input of a trigger circuit.

The invention, however, will be more fully understood from the following detailed description when taken in conjunction with the accompanying drawing in which is shown a circuit diagram of one preferred embodiment of the invention.

Referring to the drawing, a voltage source, B+, is applied at terminal 10 to supply operating voltage to the plate of triodes 12 and 14 through resistors 16 and 18 respectively. Input 20 is connected to the grids of triodes 12 and 14 through respective capacitors 22 and 24 and respective diodes 26 and 28. In a stable quiescent state, triode 12 is conducting and holding the cathode potential across resistor 30 relatively high to sustain triode 14 in a cut off condition. A negative going pulse applied at input 20 will be isolated from the grid of triode 14 by diode 28 and will charge capacitor 22 causing the grid of triode 12 to go negative. Triode 12 will cut off lowering the cathode potential and allowing conduction in triode 14. The plate voltages of triodes 12 and 14 will respond with a positive and negative pulse respectively. The negative plate of triode 14 will further suppress conduction in triode 12 through coupling capacitor 32. The output pulse at terminal 34 will be time dependent, therefore, upon the values of coupling capacitor 32 and resistor 36. The lagging edge of the input pulse, if it arrives before the lagging edge of the output pulse, may temporarily sustain conduction of triode 14 and non-conduction of triode 12. If, however, the lagging edge of the input pulse arrives after the triodes 12 and 14 have returned to their quiescent state, triode 14 will retrigger and triode 12 will cut off, causing a second output pulse. This characteristic can be taken advantage of by employing the device as a pulse multiplier. Cascading stages of the device will further increase multiplication by a factor of two for each additional stage.

A positive pulse at input 20 will be isolated from the grid of triode 12 by diode 26, and will charge capacitor 24. Grid voltage will develop across resistor 38 and triode 14 will begin conduction. Decreasing plate voltage of triode 14 will cut off triode 12 through coupling capacitor 32. The cathode potential consequently drops and sustains conduction in triode 14. Output voltage at terminal 34 consequently increases for a time duration dependent upon the values of capacitor 32 and resistor 36 resulting in an output pulse.

Regardless of the polarity of the input pulse, therefore, a positive output will always result at terminal 34 and a negative at the plate of triode 14. Also, because of the isolation effect of diodes 26 and 28, the lagging edge of each pulse will react in the circuit as the leading edge of a pulse of opposite polarity. That is, the device will react to a sudden change of input voltage and not to the polarity thereof. For this reason, an input of shorter time duration than the output will abet the triggering action and an input of longer time duration will retrigger the device upon arrival of the lagging edge thereof. Each output will also be "on time" regardless if it is taken from terminal 34 as a positive output or from the plate of triode 14 as a negative output.

The principles of the invention explained in connection with the above described embodiment will suggest other applications and modifications. It is accordingly desired that, in construing the breadth of the appended claims, they shall not be limited to the specific details shown and described in connection with the embodiment thereof.

I claim:

1. A nondiscriminating bipolar monostable multivibrator circuit comprising a pair of vacuum tubes each having a plate, a grid, and a cathode, said tubes being biased for operation so that one of said tubes is in a condition of relatively high conduction and other of said tubes is in a condition of relatively low conduction when said circuit is in its stable quiescent state in the absence of a signal applied to said circuit, input means including a pair of capacitors, and a pair of diodes each having an anode and a cathode, the anode of one of said diodes connected to the grid of one of said tubes, the cathode of said other diode connected to the grid of said other tube, said capacitors series connected between the cathode of said one diode and the anode of said other diode, an input terminal connected to the junction between said capacitors, coupling means including a resistor connected between said cathodes and a reference potential point for allowing relatively high conduction in said other tube when said one tube is in said low conduction condition, and biasing means including a capacitor connected between the grid of said one tube and the plate of said other tube for biasing and maintaining for a predetermined duration said one tube in a condition of relatively low conduction when said other tube is in said high conduction condition.

2. A nondiscriminating bipolar multivibrator circuit comprising a pair of vacuum tubes each having a plate, a grid, and a cathode; a plurality of resistors; a voltage supply connected through a first of said resistors to the plate of one of said tubes, through a second of said resistors to the grid of said one tube, and through a third resistor to the plate of the other of said tubes; the cathodes of said tubes connected together and through a fourth of said resistors to a reference potential point; a first capacitor connected between the grid of said one tube and the plate of said other tube; and an isolation input means including an input terminal, a second capacitor connected to said terminal, a first diode having an anode connected to said second capacitor and a cathode connected to the grid of one of said tubes, and a third capacitor connected to said terminal, a second diode having a cathode connected to said third capacitor and an anode connected to the grid of said other tube.

References Cited by the Examiner

UNITED STATES PATENTS

| | | | |
|---|---|---|---|
| 2,405,237 | 8/46 | Ruhlig | 328—58 |
| 2,802,101 | 8/57 | West et al. | 328—58 |
| 3,030,583 | 4/62 | Bicking | 328—207 |

FOREIGN PATENTS

| | | |
|---|---|---|
| 1,064,103 | 8/59 | Germany. |

ARTHUR GAUSS, *Primary Examiner.*

JOHN W. HUCKERT, *Examiner.*